United States Patent
Pinedo et al.

(10) Patent No.: US 7,589,731 B2
(45) Date of Patent: Sep. 15, 2009

(54) GRAPHICS SYSTEMS AND METHODS

(75) Inventors: David Pinedo, Fort Collins, CO (US);
John Marks, Fort Collins, CO (US);
Gabriel Salazar, Denver, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 846 days.

(21) Appl. No.: 10/989,121

(22) Filed: Nov. 15, 2004

(65) Prior Publication Data

US 2006/0103652 A1   May 18, 2006

(51) Int. Cl.
*G06T 11/20* (2006.01)
*G06F 17/00* (2006.01)

(52) U.S. Cl. .................... 345/443; 345/418; 345/441

(58) Field of Classification Search ............. 345/619, 345/418, 441, 443; 382/286, 100; 709/204
See application file for complete search history.

(56) References Cited

U.S. PATENT DOCUMENTS

| | | | |
|---|---|---|---|
| 6,806,825 B2 * | 10/2004 | Andrusiak et al. ........... 342/185 |
| 2002/0035596 A1 * | 3/2002 | Yang et al. .................. 709/203 |
| 2002/0073061 A1 * | 6/2002 | Collins .......................... 707/1 |
| 2003/0046432 A1 * | 3/2003 | Coleman et al. ............ 709/247 |
| 2004/0169655 A1 * | 9/2004 | Thrasher et al. ............. 345/443 |
| 2006/0153423 A1 * | 7/2006 | Collins ........................ 382/100 |
| 2007/0083597 A1 * | 4/2007 | Salesky et al. .............. 709/204 |

* cited by examiner

*Primary Examiner*—Chante Harrison (57) ABSTRACT

Embodiments of graphics systems and methods are disclosed. In one method embodiment, a graphics method comprises receiving information about a line primitive and segmenting the line primitive with a plurality of bounding areas.

29 Claims, 5 Drawing Sheets

GRAPHICS SYSTEMS AND METHODS

BACKGROUND

Graphics systems generally enable a user to create and edit two-dimensional and/or three-dimensional objects on a computer screen. Remote graphics systems can often provide the functionality of a graphics system distributed among computers over one or more networks. Remote users are able to interact with a desktop and its applications as if they were using a local workstation, providing a collaborative, shared environment of graphics among a group of users in a wide variety of industries.

One problem in implementing remote graphics systems is that the data traffic across a communication link used to implement a remote graphics system can be high, thereby burdening computing resources.

SUMMARY

An embodiment of a graphics method comprises receiving information about a line primitive, and segmenting the line primitive with a plurality of bounding areas if the line primitive is oriented at a predetermined angle.

An embodiment of a graphics system comprises a mirror driver configured to receive information about a line primitive and segment the line primitive with a plurality of bounding areas if the line primitive is oriented at a predetermined angle.

An embodiment of a graphics system comprises means for receiving information about a line primitive, and means for segmenting the line primitive with a plurality of bounding rectangles if the line primitive is oriented at a predetermined angle.

An embodiment of a graphics method on a computer-readable medium, the computer-readable medium comprises logic configured to receive information about a line primitive, and logic configured to segment the line primitive with a plurality of bounding areas if the line primitive is oriented at a predetermined angle.

An embodiment of a graphics method comprises receiving information about a line primitive, and segmenting the line primitive with a plurality of bounding areas.

An embodiment of a graphics method comprises receiving information about a line primitive, and encompassing the line primitive with a single bounding area if the line primitive is at least one of a vertical orientation, a horizontal orientation, and of a length less than a predefined length, otherwise segmenting the line primitive with plurality of bounding areas.

BRIEF DESCRIPTION OF THE DRAWINGS

The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Disclosed herein are various embodiments of graphics systems and methods, herein referred to as a graphics system for brevity. Such a graphics system includes functionality to reduce the amount of data that is passed through a network, thus reducing the bandwidth necessary to implement a graphics system. In particular, embodiments of a graphics system provide for the generation and transmission of one or more graphics primitives or information pertaining to the same of a 2-dimensional graphics display in a manner to reduce the amount of data that is processed and/or transmitted. Examples of graphics primitives include a line, circle or ellipse, arc, polygon, alphanumeric character, or text character of a 2-dimensional graphics display.

In one embodiment, a graphics system includes a mirror driver that receives a 2-dimensional line primitive, determines the endpoints of the line primitive, and decides whether to use a single bounding area or a plurality of bounding areas that segment the line primitive. For purposes of illustration, a bounding area will be represented herein using a bounding rectangle. By segmenting the line primitive, transmission of less data regarding screen changes bounded by the bounding rectangle to another workstation or other device is enabled. A bounding rectangle generally refers to a geometric area (e.g., a rectangle) that encompasses all or parts of a 2-dimensional graphics primitive. Further, note the distinction between bounding rectangles used to define the pixel area surrounding the graphics primitive, and bounding boxes. Bounding boxes generally relate to the 2 or 3-dimensional problem of clipping and collision detection.

Any process descriptions or blocks in flow charts should be understood as representing modules, segments, or portions of code which include one or more executable instructions for implementing specific logical functions in the process, and alternate implementations are included within the scope of the disclosure in which functions may be executed out of order from that shown or discussed, including substantially concurrently or in reverse order, depending on the functionality involved.

Figure 1:
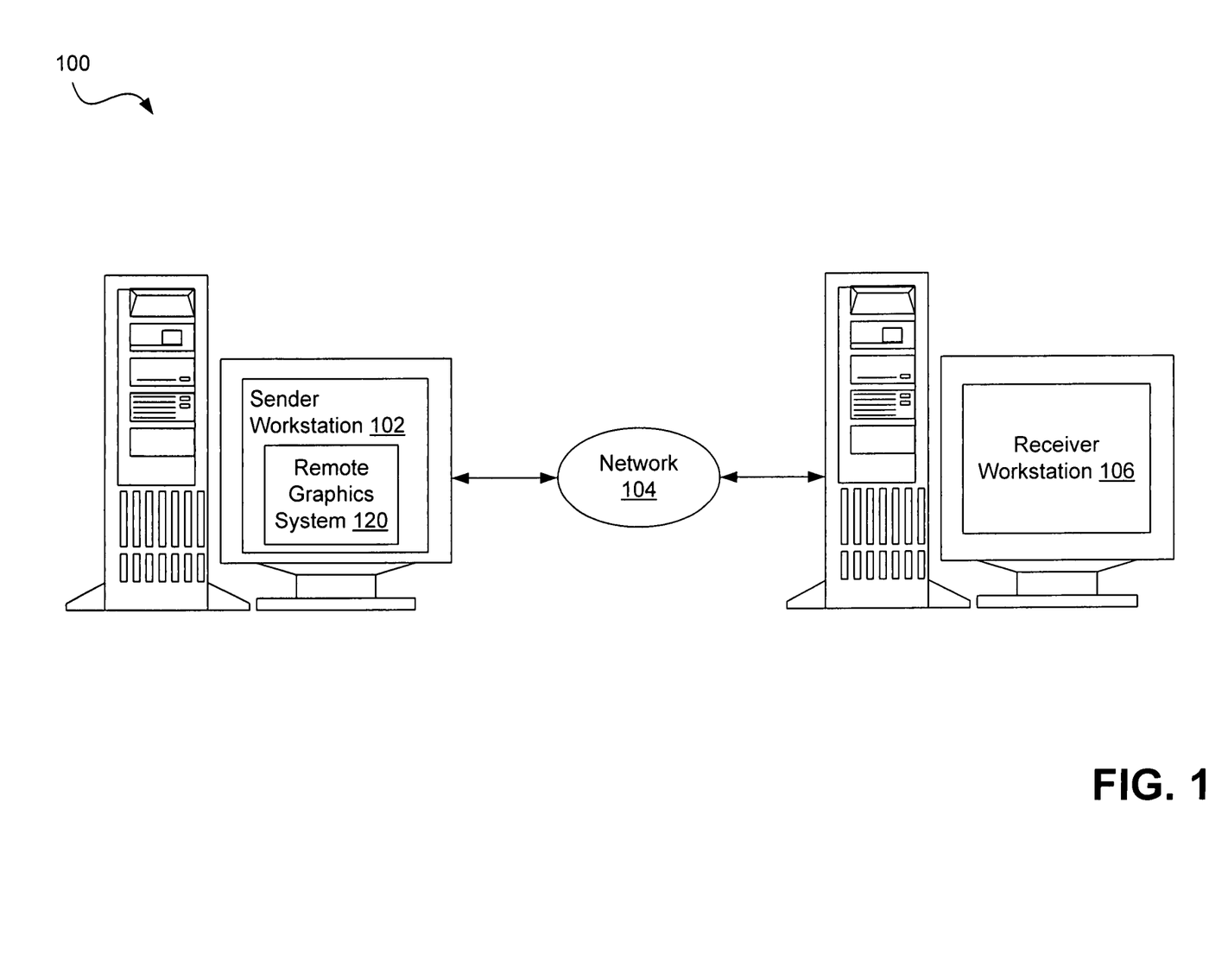
FIG. 1 is a block diagram that illustrates an example implementation for an embodiment of a graphics system.

FIG. 1 is a block diagram that illustrates a network infrastructure 100 that provides an environment for an embodiment of a graphics system 120. The network infrastructure 100 includes a sender workstation 102 that communicates over a network 104 with one or more receiver workstations 106. The network 104 may include a communications medium, such as a local or wide area network, among other media. The sender workstation 102 executes one or more applications and various graphics drivers of the graphics system 120, which monitors and records changes in the screen appearance of the display of the sender workstation 102. As a user works on the sender workstation 102 to perform various graphics functions, a user at the receiver workstation 106 can see these actions on a display of the receiver workstation 106. Additionally, a user at the receiver workstation 106 may interact with the graphics system 120 running on the sender workstation 102 as if he or she was interacting directly with the sender workstation 102. In one embodiment, the graphics system 120 compresses and sends information about screen changes to the receiver workstation 106. The receiver workstation 106 decompresses the information and updates the local display of the receiver workstation 106. The receiver workstation 106 can send keyboard and mouse events to the sender workstation 102, which are executed on the sender workstation 102.

Figure 2:
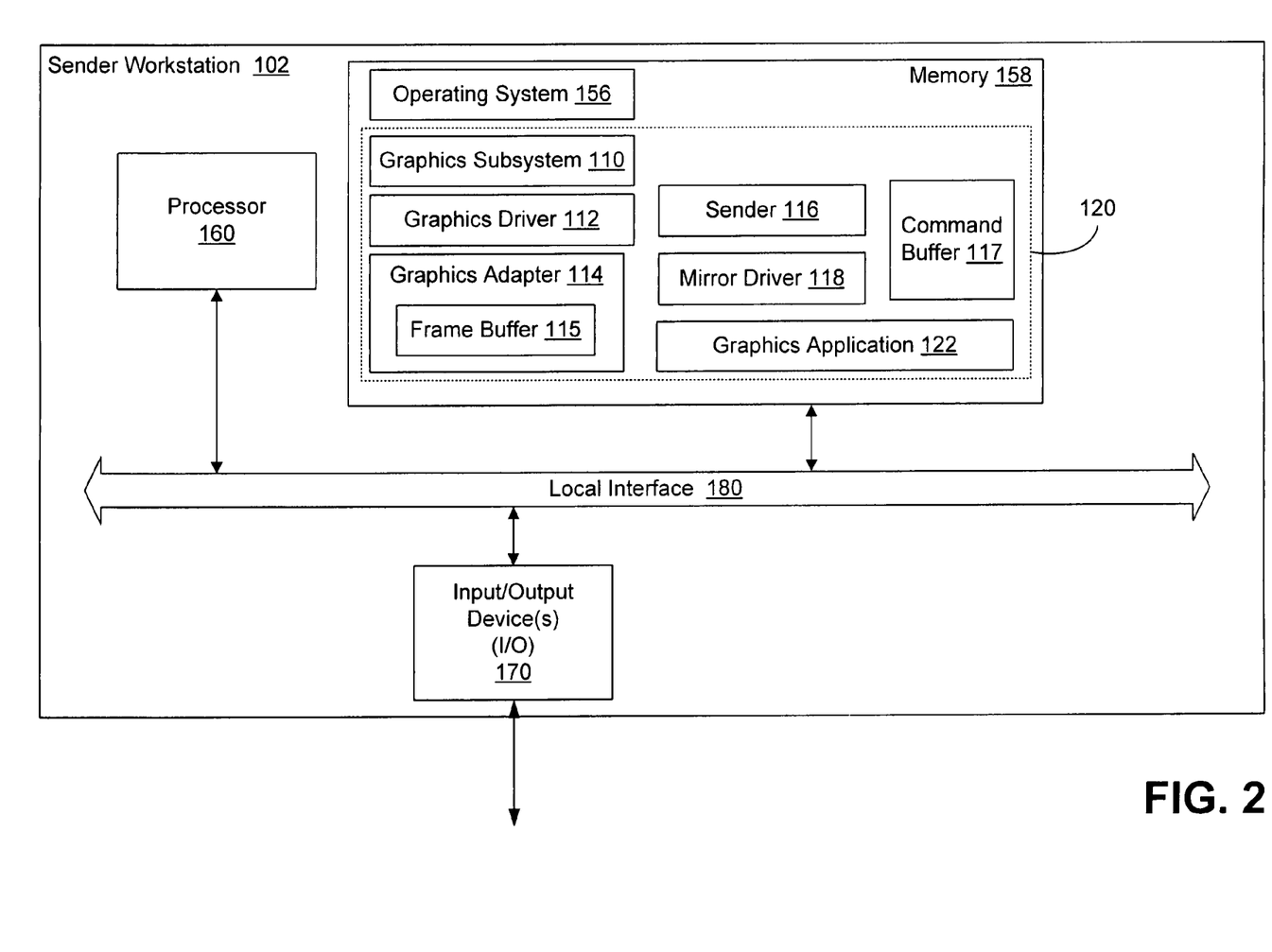
FIG. 2 is a block diagram that illustrates an embodiment of a graphics system such as might be implemented in the environment shown in FIG. 1.

FIG. 2 is a block diagram that illustrates an embodiment of the graphics system 120 as might be implemented in the sender workstation 102. The graphics system 120 comprises one or more modules, including a graphics subsystem 110, a graphics driver 112, a graphics adapter 114 (which may include a frame buffer 115), a sender module 116, a mirror driver 118, and a graphics application 122. Embodiments of graphics system 120 may include additional components shown in the sender workstation 102, such as a command buffer 117.

The graphics application 122, responsive to a user input (e.g., to draw a graphics image on a display screen), makes a call (e.g., via an applications programming interface, API) to the graphics subsystem 110. The graphics application 122 can include substantially any application that uses a graphics API, such as GDI, DIRECTDRAW, DIRECT3D, OPENGL, among other graphics APIs. The graphics subsystem 110 in turn may communicate a line draw request to the graphics driver 112. The graphics driver 112 receives a graphics command from the graphics subsystem 110 and transmits a graphics command to the graphics adapter 114. The graphics adapter 114 renders the line corresponding to the graphics command (e.g., line draw request) into the frame buffer 115, also known as a display surface, and further displays the results using an attached display device, such as a monitor.

The mirror driver 118 is somewhat similar in function to the graphics driver 112. The mirror driver 118 also receives all or substantially all graphics commands that are sent from the graphics subsystem 110 to the graphics driver 112. The mirror driver 118 keeps track of all regions of the display of the sender workstation 102 that are changed due to the writing, for example, of a line primitive. The mirror driver 118 also keeps track of the type of graphics command, as well as any parameters (e.g., dimensions, such as endpoints, etc.) of the graphics command that are drawn in each region. As a graphics command arrives from the graphics subsystem 110, the mirror driver 118 creates a list of commands in the command buffer 117 for the sender 116. The command buffer 117 may also include other information, such as data corresponding to graphics primitives, among other information. The mirror driver 118 sends the list of commands to the sender 116. The sender 116 uses the list to determine which regions of the screen have changed in response to a graphics command and reads from the part of the frame buffer 115 corresponding to the changed regions. These regions may be bounded in area by the coordinates of a bounding rectangle (described below). The buffered commands may be sent to the sender 116 the next time the sender 116 is able to process additional commands to send to the receiver workstation 106 (FIG. 1).

The sender 116 may request the list of commands from the mirror driver 118, or the list may be sent to the sender 116 in the absence of a request by the sender 116. A region affected by a graphics command may be defined using a geometric area bounded, for example, by a rectangle (e.g., a bounding rectangle as described below). A bounding rectangle may be defined by an x-coordinate, y-coordinate, width, and height data as well as a type field that identifies the graphics command that was used to render the region. The sender 116 sends an area (e.g., pixels of an image, either compressed or not compressed) encompassed by one or more bounding rectangles to the receiver workstation 106 (FIG. 1) over the network 104 (FIG. 1). In some embodiments, the sender 116 may send, in addition to or in lieu of the bounded area or areas, a command for implementation by the receiver workstation 106. The sender 116 also can receive input/output data, such as keyboard and mouse events, from the receiver workstation 106, and process the same.

A receiver module is a software application or service in the receiver workstation 106 that receives one or more a commands from the sender 116 and displays the results. The receiver module can handle I/O data, such as keyboard and mouse events, and send them to the sender 116.

The type of commands can include graphics commands such as a text command, line command, bitmap draw command, and copy command, among others. A text command generally includes a command to display a string of text that is to be drawn using a specified font, font size, foreground color, and background color to a specified location. A line command generally includes a command to display one or more lines to be drawn using a specified line width, style, and color using specified endpoints. A bitmap draw command generally includes a command to display a bitmap to be drawn to a specified location with a specified width and height. A copy command generally includes a command to display a rectangle on the screen that is to be copied from a source to a destination region. Other commands include commands that are not necessarily rendering a graphics primitive (i.e., graphics commands), such as a modify command. A modify command specifies a particular region of a display screen that has been modified.

Generally, in terms of hardware architecture, the sender workstation 102 includes a processor 160, memory 158, and one or more input and/or output (I/O) devices 170 (or peripherals) that are communicatively coupled via a local interface 180. The local interface 180 can be, for example but not limited to, one or more buses or other wired or wireless connections. The local interface 180 may have additional elements, which are omitted for simplicity, such as controllers, buffers (caches), drivers, repeaters, and receivers, to enable communications. Further, the local interface 180 may include address, control, and/or data connections to enable appropriate communications among the aforementioned components.

The processor 160 is a hardware device for executing software, particularly that which is stored in memory 158. The processor 160 can be any custom made or commercially available processor, a central processing unit (CPU), an auxiliary processor among several processors associated with the sender workstation 102, a semiconductor-based microprocessor (in the form of a microchip or chip set), a macroprocessor, or generally any device for executing software instructions.

Memory 158 can include any one or combination of volatile memory elements (e.g., random access memory (RAM, such as DRAM, SRAM, SDRAM, etc.)) and nonvolatile memory elements (e.g., read-only memory (ROM)). Memory 158 cooperates through the local interface 180. In some embodiments, memory 158 may incorporate electronic, magnetic, optical, and/or other types of storage media. Note that memory 158 can have a distributed architecture, where various components are situated remote from one another, but can be accessed by the processor 160.

The software in memory 158 may include one or more separate programs, each of which comprises an ordered listing of executable instructions for implementing logical functions. In the embodiment shown in FIG. 2, the software in memory 158 includes a suitable operating system (O/S) 156 and the modules of the graphics system 120. In general, the operating system 156 essentially controls the execution of other computer programs, and provides scheduling, input-output control, file and data management, memory management, and communication control and related services.

The mirror driver 118 is a source program, executable program (object code), script, or any other entity comprising a set of instructions to be performed. The mirror driver 118 can be implemented as a single module, or as a distributed network of modules of like-functionality. When a source program, then the program is translated via a compiler, assembler, interpreter, or the like, which may or may not be included within the memory 158, so as to operate properly in connection with the O/S 156.

The I/O devices 170 may include input devices, for example but not limited to, a keyboard, mouse, scanner, microphone, etc. Furthermore, the I/O devices 170 may also include output devices, for example but not limited to, a printer, display, etc. Finally, the I/O devices 170 may further include devices that communicate both inputs and outputs, for instance but not limited to, a modulator/demodulator (modem for accessing another device, system, or network), a radio frequency (RF) or other transceiver, a telephonic interface, a bridge, a router, etc.

When the sender workstation 102 is in operation, the processor 160 is configured to execute software stored within the memory 158, to communicate data to and from the memory 158, and to generally control operations of the sender workstation 102 pursuant to the software. The mirror driver 118, for example, in whole or in part, but typically the latter, is read by the processor 160, sometimes buffered within the processor 160, and then executed.

When one or more modules of the graphics system 120 is implemented in software, as is shown in FIG. 2, it should be noted that the graphics system 120 can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The graphics system 120 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

It will be appreciated that the various components described herein may be implemented in software, hardware, or a combination thereof. For example, when the functionality of one or more modules of the graphics system 120 is implemented in hardware (or a portion of the functionality of an individual module, such as the mirror driver 118, is implemented in hardware), the one or more modules (or portions thereof) of the graphics system 120 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc., or can be implemented with other technologies now known or later developed.

Figure 3:
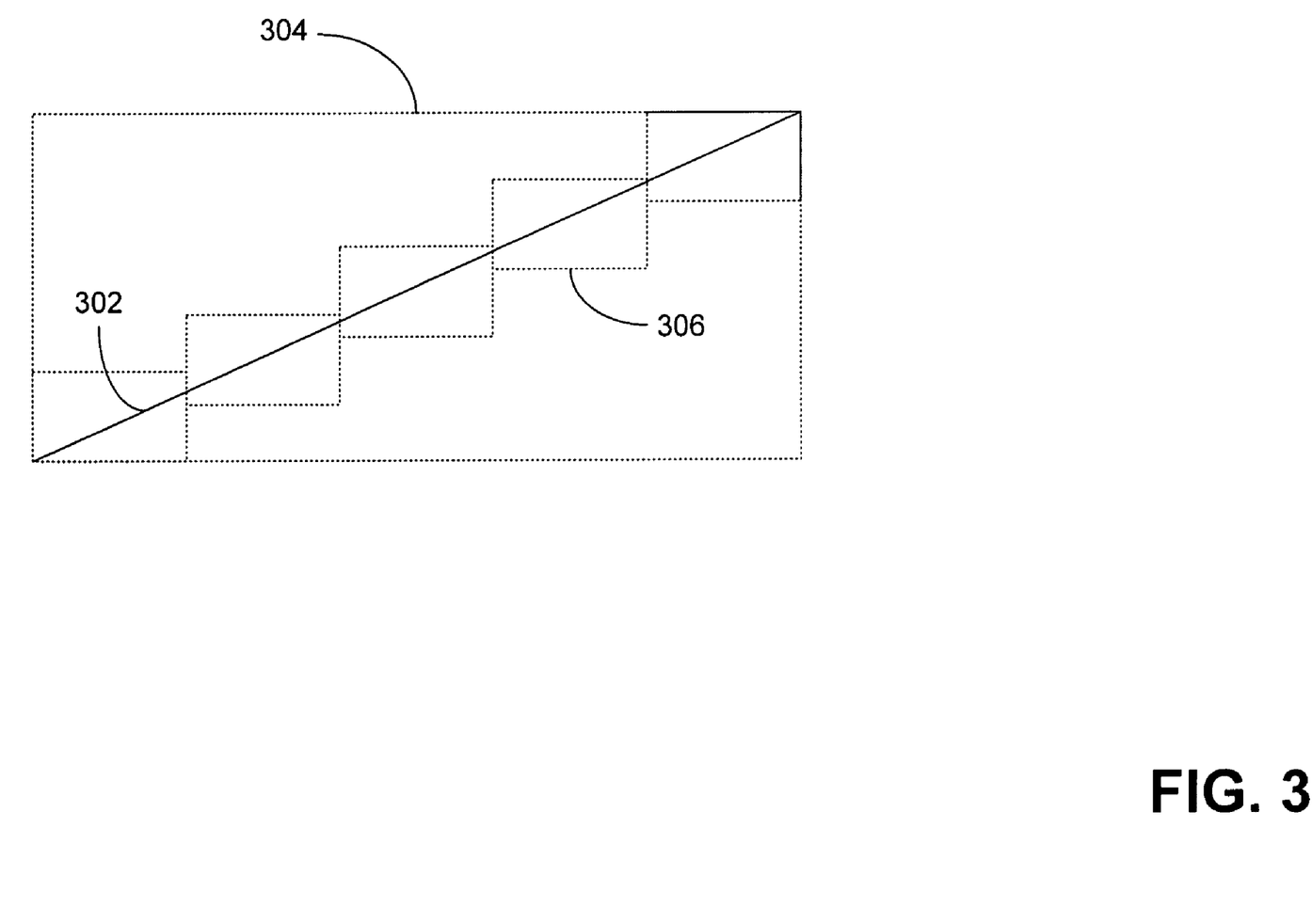
FIG. 3 is a schematic diagram that illustrates exemplary bounding rectangles for a line primitive.

FIG. 3 is a schematic diagram that illustrates various exemplary bounding rectangles 304 and 306 for a line primitive 302 as could be provided by the graphics system 120 illustrated in FIG. 2. The mirror driver 118 uses a bounding rectangle generally to keep track of changes in a screen. Although shown as a rectangle, bounding polygons (or other geometric shapes) can be used in some embodiments. The line primitive 302 is a graphics primitive encompassed by an area that can be optimized to reduce the amount of data transmitted from the sender workstation 102 to the receiver workstation 106. When the mirror driver 118 receives the line primitive 302, it can create a bounding rectangle 304 based on the endpoints of the line primitive 302. The mirror driver 118 provides information about the bounding rectangle 304 to the sender 116, which in turn reads data from the frame buffer 115 (FIG. 2) of the graphics adapter 114 (FIG. 2) corresponding to the area of the screen specified by the bounding rectangle 304 and sends the corresponding data to the receiver workstation 106 to display the line primitive 302 on the receiver workstation display.

Often, when using the bounding rectangle 304, very few of the pixels within the bounding rectangle 304 may actually change. That is, most of the screen region within the bounding rectangle 304 may not be affected when the line primitive 302 is drawn, so sending the data corresponding to these unchanged areas may be unnecessary or wasteful. The mirror driver 118 reduces the number of pixels that are to be read and transmitted by creating a plurality of bounding rectangles 306 that follow the path of the line primitive 302. One result is that the total area that is considered modified and subject to transmission is considerably less than if a single bounding rectangle 304 is used. The amount of bounding rectangles 306 can be a fixed value based, for example, on the length of the line primitive, the slope of the line primitive, and/or the number of desired pixels (e.g., 20-30 pixels) per bounding rectangle. In some embodiments, the choice of number of bounding rectangles 306 can be user-defined. The bounding rectangles 306 may be uniform in area, or in some embodiments, non-uniform.

Figure 4:
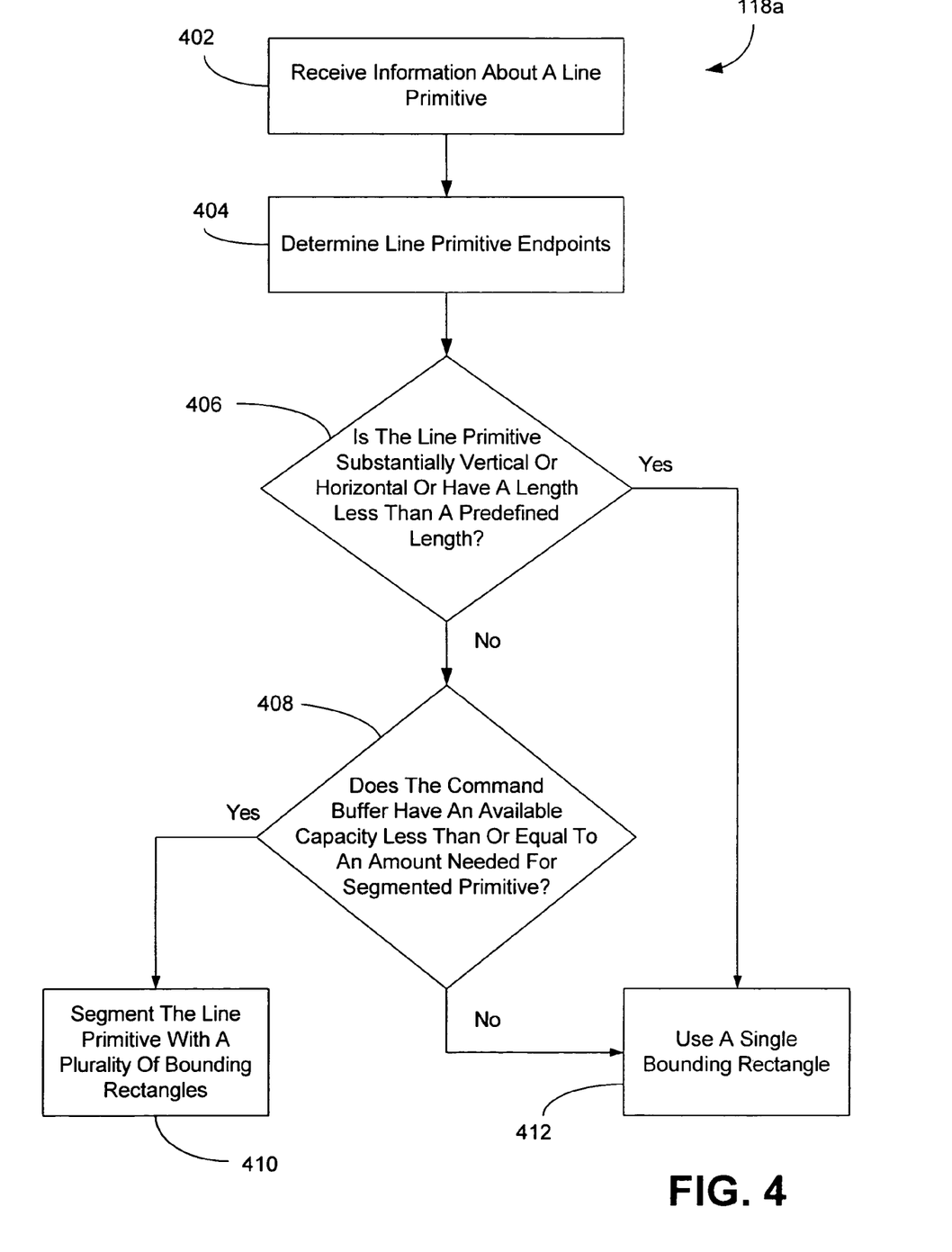
FIG. 4 is a flow diagram that illustrates a method embodiment for providing bounding rectangles such as are shown in FIG. 3.

With continued reference to FIG. 3, FIG. 4 is a flow diagram that illustrates a method embodiment 118a of the mirror driver 118 (FIG. 2) for determining when to use the bounding rectangle 304 or 306 for processing and transmission of data. The mirror driver method 118a includes receiving information describing a line primitive (402) (e.g., line primitive 302). A determination is made as to the endpoints of the line primitive (404). If the line primitive is a vertical line or a substantially vertical line, or is a horizontal line or substantially horizontal line, or is a line having a length that is less than a predefined length ("yes" to 406), then a single bounding rectangle is used to encompass the line primitive (412). In other words, the area of a bounding rectangle (e.g., bounding rectangle 304) for horizontal, vertical, or short lines is small, and thus a bounding rectangle 304 may be used without utilizing much data corresponding to unchanged data. The determination of a predefined line length or whether the angular degree from vertical or horizontal is substantial can be based on a preset value or determined in-process. In either case, such a determination may be based, for example, on an algorithm that runs a plurality of area calculation permutations based on the line length or angular degree from vertical or horizontal to determine the smallest area. Herein reference to vertical will also include substantially vertical. Similarly, reference to horizontal will also include substantially horizontal. If none of these types of line primitive features apply ("no" to 406), then a determination is made as to whether the command buffer 117 (FIG. 2) has the available capacity to provide the segmentation (408). That is, breaking the line primitive 302 into segments results in more commands being added to the command buffer 117, possibly overflowing the buffer 117. The mirror driver 118a may choose to use only one command corresponding to using the bounding rectangle 304 (412) rather than many commands corresponding to using the bounding rectangles 306 (410) if overflow is possible. Otherwise, assuming capacity is sufficient, the line primitive 302 is segmented with a plurality of bounding rectangles 306.

Note that in some embodiments, one or more of these processes may be omitted or modified. For instance, if there is no or minimal risk of buffer overflow (e.g., due to sufficient capacity), then (408) may be omitted. Further, in some embodiments, the decision may be made to always segment the line regardless of angular degree from horizontal, vertical, or regardless of the length. In some embodiments, the decision may be made to use a single bounding rectangle only if one (or more) of these features applies. For example, a line primitive may have an angle that is greater than a predetermined angle (i.e., substantially vertical or horizontal), and thus normally would be segmented. However, the mirror driver 118 may be configured to ignore this line primitive feature and only segment the line primitive if the length of the line was greater than a predetermined value.

Figure 5:
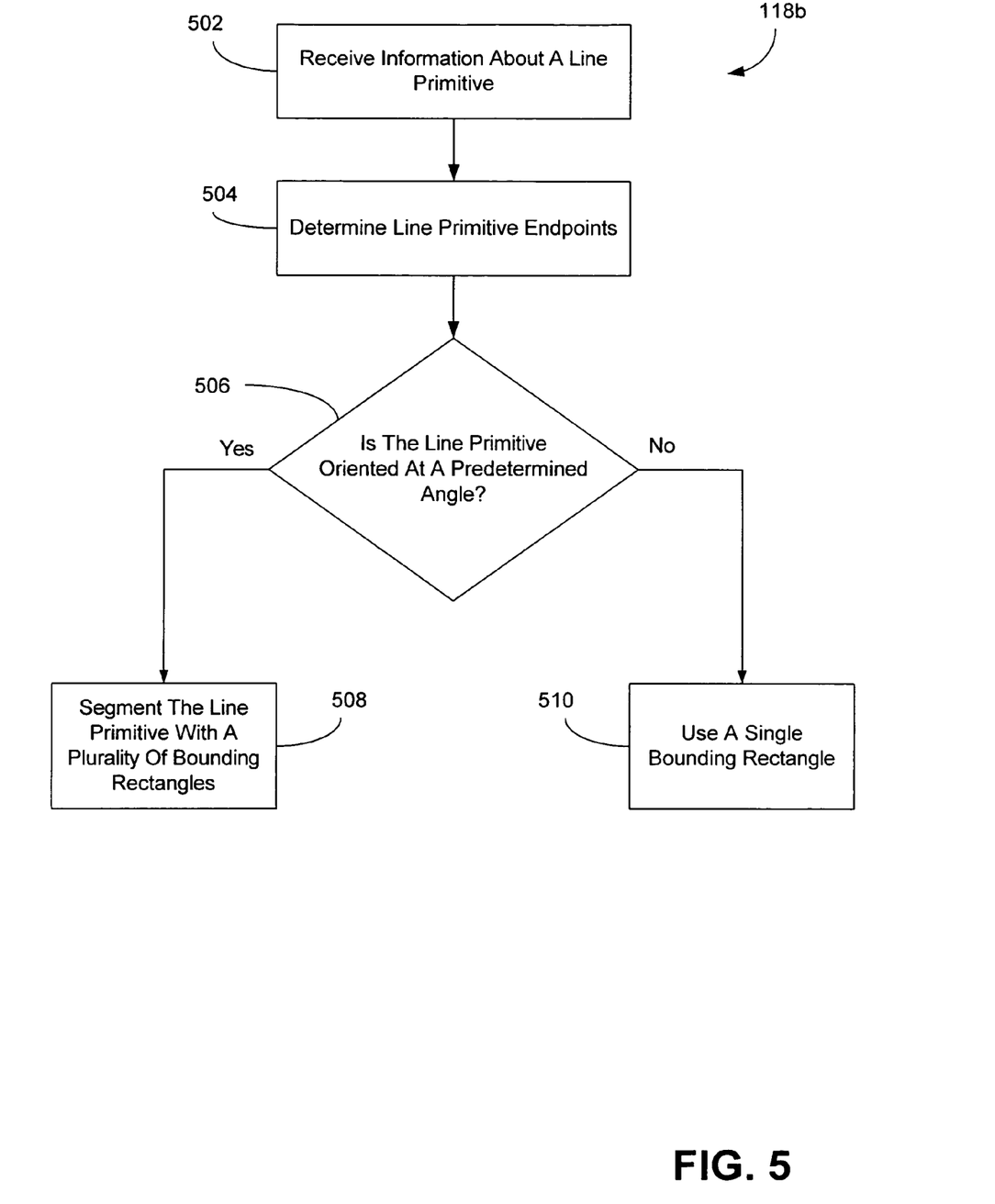
FIG. 5 is a flow diagram that illustrates a method embodiment for providing bounding rectangles such as are shown in FIG. 3.

In view of the above description, FIG. 5 is a flow diagram that illustrates another method embodiment 118b of the mirror driver 118 (FIG. 2) for determining when to use the bounding rectangle 304 or 306 for processing and transmission of data. With simultaneous reference to FIG. 3, the mirror driver method 118b comprises receiving information describing a line primitive (502) (e.g., line primitive 302). A determination is made as to the endpoints of the line primitive (504). If the line primitive is oriented at a predetermined angle ("yes" to 506), the line primitive 302 is segmented with a plurality of bounding rectangles 306 (508). Otherwise ("no" to 506), a single bounding rectangle is used to encompass the line primitive (510). As described above, the area of a bounding rectangle (e.g., bounding rectangle 304) for horizontal, vertical, or short lines is small, and thus a bounding rectangle 304 may be used without utilizing much data corresponding to unchanged data. It will be understood that the above description is intended as an example and is not meant to be limiting. For example, the use of a predetermined angle is not intended to limit the slope at which a primitive will or will not be segmented. The determination of a predefined line length or whether the angular degree from vertical or horizontal is substantial can be based on a preset value or determined in-process. In either case, such a determination may be based, for example, on an algorithm that runs a plurality of area calculation permutations based on the line length or angular degree from vertical or horizontal to determine the smallest area.

What is claimed:

1. A graphics method, comprising:
receiving, at a computing device, information about a line primitive; and
segmenting the line primitive with a plurality of bounding areas if the line primitive is oriented at a predetermined angle.

2. The method of claim 1, further comprising determining endpoints of the line primitive.

3. The method of claim 1, further comprising determining whether to segment the line primitive.

4. The method of claim 1, further comprising encompassing the line primitive with a single bounding area if the line primitive is vertical in orientation.

5. The method of claim 1, further comprising encompassing the line primitive with a single bounding area if the line primitive is horizontal in orientation.

6. The method of claim 1, further comprising encompassing the line primitive with a single bounding area if the line primitive has a length less than a predetermined value.

7. The method of claim 1, further comprising encompassing the line primitive with a single bounding area if a command buffer will overflow when implementing the segmenting.

8. The method of claim 1, further comprising transmitting the pixels corresponding to the area of the bounding area to a remote device.

9. The method of claim 1, further comprising segmenting the line primitive with a plurality of bounding rectangles.

10. The method of claim 1, further comprising receiving endpoints of the line primitive.

11. A graphics system, comprising:
a processor and;
a memory component that stores a mirror driver configured to receive information about a line primitive and segment the line primitive with a plurality of bounding areas if the line primitive is oriented at a predetermined angle.

12. The system of claim 11, wherein the mirror driver is configured to determine endpoints of the line primitive.

13. The system of claim 11, wherein the mirror driver is configured to determine whether to segment the line primitive.

14. The system of claim 11, wherein the mirror driver is configured to encompass the line primitive with a single bounding area if the line primitive is vertical in orientation.

15. The system of claim 11, wherein the mirror driver is configured to encompass the line primitive with a single bounding area if the line primitive is horizontal in orientation.

16. The system of claim 11, wherein the mirror driver is configured to encompass the line primitive with a single bounding area if the line primitive has a length of less than a predetermined value.

17. The system of claim 11, wherein the mirror driver is configured to encompass the line primitive with a single bounding area if a command buffer will overflow when implementing the segmenting.

18. The system of claim 11, further comprising sender logic configured to receive a command corresponding to information about the area bounded by the bounding area and transmit pixels corresponding to the area described by the graphics command to a remote device.

19. The system of claim 11, wherein at least one of the bounding areas comprises a bounding rectangle.

20. The system of claim 11, further comprising a processor configured to execute instructions corresponding to the mirror driver.

21. A graphics system, comprising:
means for receiving information about a line primitive; and
means for segmenting the line primitive with a plurality of bounding rectangles if the line primitive is oriented at a predetermined angle.

22. The system of claim 21, wherein the means for receiving comprises at least one of a graphics application, a graphics subsystem, and a processor.

23. The system of claim 21, wherein the means for segmenting comprises at least one of a mirror driver and a processor.

24. The system of claim 21, further comprising means for determining whether to segment the line primitive.

25. A computer-readable medium encoded with computer executable instructions to implement a graphics method, the computer-readable medium comprising:
logic configured to receive information about a line primitive; and
logic configured to segment the line primitive with a plurality of bounding areas if the line primitive is oriented at a predetermined angle.

26. The computer-readable medium of claim 25, further comprising logic configured to determine whether to segment the line primitive.

27. The computer-readable medium of claim 25, further comprising logic configured to send information about the line primitive to a remote device.

28. A graphics method, comprising:
  receiving, at a computing device, information about a line primitive; and
  segmenting the line primitive with a plurality of bounding areas.

29. A graphics method, comprising:
  receiving, at a computing device, information about a line primitive; and
  encompassing the line primitive with a single bounding area if the line primitive is at least one of a vertical orientation, a horizontal orientation, and of a length less than a predefined length otherwise segmenting the line primitive with plurality of bounding areas.

* * * * *